(12) United States Patent
Hampo et al.

(10) Patent No.: US 7,456,602 B2
(45) Date of Patent: Nov. 25, 2008

(54) SYSTEM AND METHOD OF COMMONLY CONTROLLING POWER CONVERTERS

(75) Inventors: Richard J. Hampo, Plymouth, MI (US); John M. Van Dyke, Plymouth, MI (US); Lizhi Zhu, Canton, MI (US); Sayeed Ahmed, Canton, MI (US)

(73) Assignee: Continental Automotive Systems US, Inc., Auburn Hills ( * ) Notice: Subject to any disclaimer, the term of this patent is extended or adjusted under 35 U.S.C. 154(b) by 432 days.

(21) Appl. No.: 11/282,301

(22) Filed: Nov. 18, 2005

(65) Prior Publication Data

US 2007/0114954 A1     May 24, 2007

(51) Int. Cl.
H02P 27/04 (2006.01)

(52) U.S. Cl. ............... 318/800; 318/801; 318/105

(58) Field of Classification Search ......... 318/800, 318/801, 105, 802, 807, 812; 363/142, 70, 363/37, 144; 307/64, 26
See application file for complete search history.

(56) References Cited

U.S. PATENT DOCUMENTS

| | | | |
|---|---|---|---|
| 6,201,319 B1 * | 3/2001 | Simonelli et al. | 307/26 |
| 6,496,393 B1 | 12/2002 | Patwardhan | 363/70 |
| 6,603,672 B1 | 8/2003 | Deng et al. | 363/37 |
| 6,624,533 B1 * | 9/2003 | Swanson et al. | 307/64 |
| 6,636,429 B2 | 10/2003 | Maly et al. | 361/818 |
| 6,793,502 B2 | 9/2004 | Parkhill et al. | 439/66 |
| 6,845,017 B2 | 1/2005 | Ahmed et al. | 361/775 |
| 6,845,020 B2 | 1/2005 | Deng et al. | 363/37 |
| 6,898,072 B2 | 5/2005 | Beihoff et al. | 361/676 |
| 6,906,404 B2 | 6/2005 | Maly et al. | 257/678 |
| 6,987,670 B2 | 1/2006 | Ahmed et al. | 361/699 |
| 2002/0034088 A1 | 3/2002 | Parkhill et al. | 363/144 |
| 2002/0167828 A1 | 11/2002 | Parkhill et al. | 363/144 |
| 2004/0230847 A1 | 11/2004 | Patwardhan et al. | 713/300 |
| 2005/0270745 A1 | 12/2005 | Chen et al. | 361/707 |
| 2005/0270806 A1 | 12/2005 | Zhu | 363/17 |

FOREIGN PATENT DOCUMENTS

| | | |
|---|---|---|
| EP | 1603224 | 12/2005 |
| WO | 2004082122 | 9/2004 |
| WO | 2005081395 | 9/2005 |
| WO | 1717945 | 11/2006 |

OTHER PUBLICATIONS

U.S. Appl. No. 10/658,804, filed Sep. 9, 2003, Ahmed et al.
U.S. Appl. No. 11/245,723, filed Oct. 6, 2005, Parkhill et al.
U.S. Appl. No. 11/255,162, filed Oct. 20, 2005, Flett et al.

(Continued)

*Primary Examiner*—Karen Masih (57) ABSTRACT

A system and method for controlling power converters are disclosed. Briefly described, one embodiment is a method comprising communicating at least one first control signal to an alternating current/direct current (AC/DC) power converter from a multi-converter system controller, the AC/DC power converter and the multi-converter system controller residing in a power system electronics housing, and communicating at least one second control signal to a direct current/direct current (DC/DC) power converter from the multi-converter system controller, the DC/DC power converter residing in a power system electronics housing.

24 Claims, 5 Drawing Sheets

OTHER PUBLICATIONS

U.S. Appl. No. 60/233,992, filed Sep. 20, 2000, Parkhill et al.
U.S. Appl. No. 60/233,993, filed Sep. 20, 2000, Ahmed.
U.S. Appl. No. 60/233,994, filed Sep. 20, 2000, Parkhill et al.
U.S. Appl. No. 60/233,995, filed Sep. 20, 2000, Parkhill et al.
U.S. Appl. No. 60/233,996, filed Sep. 20, 2000, Parkhill et al.
U.S. Appl. No. 60/471,387, filed May 16, 2003, Flett et al.
U.S. Appl. No. 60/621,012, filed Oct. 20, 2004, Flett et al.
Anonymous: "Power Control Unit", Online Internet Article,www.hybridsynergydrive.com/en/pcu.html, 1 page, retrieved Apr. 2, 2007.
Anonymous: "Toyota Prius, 2004 Model, Emergency Response Guide", Online Internet Article, techinfo.toyota.com/public/main/2ndpri, pp. 1-23. Jan. 22, 2004.
International Search Report and Written Opinion dated May 7, 2007.

* cited by examiner

SYSTEM AND METHOD OF COMMONLY CONTROLLING POWER CONVERTERS

BACKGROUND OF THE INVENTION

1. Field of the Invention

This disclosure generally relates to electrical power systems, and more particularly, to power system architectures suitable for commonly controlling DC/AC power converters and DC/DC power converters.

2. Description of the Related Art

An alternating current (AC) electric machine may be coupled to a direct current (DC) system via an AC/DC bi-directional power converter. When the AC electrical machine is operating as a motor, the AC/DC power converter provides power to the AC electric machine by inverting DC power from a DC power source, into AC power.

Alternatively, the AC electric machine may operate as a generator when torque is applied to the machine shaft. For example, when an electric motor is braking, running by inertia, or where an electric vehicle employing the motor is running downhill, the electric motor generates AC electric power. Accordingly, the AC/DC power converter rectifies the AC power generated by the AC electric machine into DC power. The DC power is typically stored in a power storage device, for example, an array of chemical battery cells and/or super- or ultra-capacitors. This mode of operation is sometimes referred to as the regenerative mode.

The DC side of the bi-directional AC/DC power converter is typically coupled to a high voltage (HV) DC bus. Accordingly, power transfers from/to the electric machine, via the AC/DC power converter, are transferred over the HVDC bus to other components of the power system.

An AC/DC system controller is typically employed to control operation of the bi-directional AC/DC power converter such that power, voltage and/or current transmitted over the HVDC bus is regulated (controlled). For example, one of the functions of the AC/DC system controller is to prevent over voltage conditions on the HVDC bus when the AC electric machine is operating in a generator mode. As another example, the AC/DC system controller may control the AC/DC power converter to adjust various operating aspects of the AC electric machine, such as speed and/or torque.

Other components are also employed in the power system, including various loads and DC power sources. Examples of loads include various internal components (such as housekeeping loads, etc.), load drawn by external devices (such as lights, small motors, electronic devices, etc.) or power conditioning devices (such as capacitors, reactors, etc.). Examples of DC power sources include fuel cell systems, DC machines (driven, for example, by a combustion engine), capacitors and batteries. Some types of DC power sources are configured to both provide and store electric energy. Other types of DC power sources are configured to non-renewable fuel energy sources into electric energy.

In some instances, the operating voltage of the load(s) and/or the DC power source(s) is less than the operating voltage of the HVDC bus. Accordingly, coupling between the lower voltage components and the HVDC bus requires a voltage conversion device, the DC/DC power converter. Accordingly, power flow between these load(s) and/or these DC power source(s), and the HVDC, bus is transferred through the DC/DC power converter.

When electric power is supplied to the electric machine (via the above-described AC/DC power converter), power received from these lower voltage DC power source(s) may be stepped up, or boosted, from the relatively lower operating voltage of the DC power source(s) to the relatively higher operating voltage of the HVDC bus by the DC/DC power converter. Conversely, when power is supplied from the electric machine (via the AC/DC power converter), power received over the HVDC bus may be stepped down, or bucked, from the relatively higher operating voltage of the HVDC bus to the relatively lower operating voltage of the DC power source(s) by the DC/DC power converter. Accordingly, DC power sources capable of storing received energy are then able to store the received low voltage DC power for later use.

In addition to transferring power between the DC power source(s) and the HVDC bus, the DC/DC power converter may be operated in a manner which regulates voltage on the HVDC bus and/or the terminals of the DC power source(s). Accordingly, a DC/DC system controller is typically employed to control operation of the DC/DC power converter such that power, voltage and/or current transmitted between the HVDC bus and the DC power source(s) is regulated (controlled).

During the manufacture of devices that employ the above-described components, such as an electric motor vehicle, the AC/DC power converter, the AC/DC system controller, the DC/DC power converter and the DC/DC system controller are typically fabricated or assembled onto separate modular components. These separate modular components are then coupled together using various types of electrical connectors. Such connectors may be interlocking pin/socket devices, wiring harnesses, and/or electrically conductive nuts/bolts or the like. Welding, soldering or the like may also be used to couple connectors of the above-described components. One skilled in the art appreciates the difficulties in, and expense of, coupling the connectors of the above-described components during the manufacturing process. One skilled in the art also appreciates the susceptibility of such connections to wear or other damage, which decreases reliability or the mean time between failure, and shortens the average life-time of the system.

BRIEF SUMMARY OF THE INVENTION

A system and method for controlling power converters in a power system coupled to an electric machine are disclosed. Briefly described, in one aspect, an embodiment may be summarized as a method comprising communicating at least one first control signal to an alternating current/direct current (AC/DC) power converter from a multi-converter system controller, the AC/DC power converter and the multi-converter system controller residing in a power system electronics housing; and communicating at least one second control signal to a direct current/direct current (DC/DC) power converter from the multi-converter system controller, the DC/DC power converter residing in a power system electronics housing.

In another aspect, an embodiment may be summarized as a power system that controls a power transfer to an electric machine comprising, an AC/DC power converter operable to convert alternating current (AC) power received from the electric machine into direct current (DC) power when the electric machine is operating as a generator, and operable to convert received DC power from at least one DC power source into AC power when the electric machine is operating as a motor, at least one DC/DC power converter operable to convert a low DC voltage to a high DC voltage, and a multi-converter system controller operable to control the AC/DC power converter and the DC/DC power converter.

In yet another aspect, an embodiment may be summarized as a modular power system that controls power transfers between an electric machine and at least one DC power source, comprising a power system electronics housing coupleable to the electric machine; an AC/DC power converter residing in the power system electronics housing, operable to convert AC power received from the electric machine into DC power when the electric machine is operating as a generator, and operable to convert received DC power from the DC power source into AC power when the electric machine is operating as a motor; at least one DC/DC power converter residing in the power system electronics housing, and operable to convert a low DC voltage to a high DC voltage; and a multi-converter system controller residing in the power system electronics housing, operable to control the AC/DC power converter by communicating at least one first control signal to the AC/DC power converter, and operable to control the DC/DC power converter by communicating at least one second control signal to the AC/DC power converter.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION OF THE INVENTION

Figure 1:
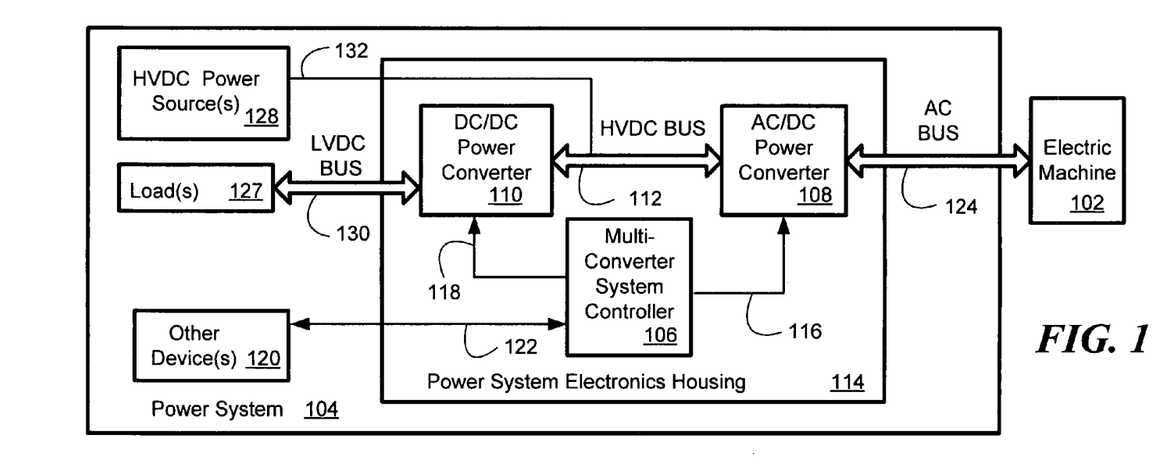
FIG. 1 is a block diagram of an electric machine and a power system according to one exemplary embodiment.

FIG. 1 is a block diagram of an electric machine 102 and a power system 104 according to one illustrated embodiment. The power system 104 comprises a multiple unit converter (multi-converter) system controller 106, a bi-directional alternating current/direct current (AC/DC) power converter 108, a bi-directional direct current/direct current (DC/DC) power converter 110 and high voltage DC (HVDC) bus 112 electrically coupling the AC/DC power converter 108 and DC/DC power converter 110. The above-described components reside in the power system electronics housing 114. The power system 104 may employ other components, not shown.

The multi-converter system controller 106 is operable to control two or more power converters. In the exemplary embodiment illustrated in FIG. 1, the multi-converter system controller 106 provides control signals to the AC/DC power converter 108 and the DC/DC power converter 110, via connections 116 and 118, respectively. In some embodiments, the multi-converter system controller 106 may be operable to provide control signals to one or more other devices 120, via connection 122. Such devices 120 may reside outside of the power system electronics housing 114 as illustrated, or may reside within the power system electronics housing 114.

A benefit realized by the multi-converter system controller 106 is that the above-described components, and other related power system electronics (not shown), may be conveniently assembled within the power system electronics housing 114 as a single modular unit. Prior art systems using separate system controllers for the various power converters typically are assembled into separate controller/converter modules, thus requiring significantly more coupling components to couple the various separate controller/converter modules together during the final assembly stages.

As noted above, the DC side of a AC/DC power converter 108 is coupled to the HVDC bus 112 and the AC side is coupled to an AC bus 124. The AC bus 124 may take a variety of forms depending upon the application. Non-limiting examples of AC bus architecture include single phase, three phase, three phase-ground or neutral, etc. Accordingly, power transfers between the power system 104 and the electric machine 102 are made over the HVDC bus 112, the AC/DC power converter 108 and the AC bus 124.

The AC bus 124 may comprise two or more portions, one of which resides within the power system electronics housing 114. Thus, the portion of the AC bus 124 in the power system electronics housing 114 can be coupled to another portion of the AC bus 124 to facilitate modular construction of the power system electronics housing 114.

Power system 104 may also include one or more low voltage loads 127 and/or high voltage (HV) DC power sources 128. Such low voltage loads 127 may be coupled to low voltage (LV) DC bus 130. Examples of loads 127 may include, but are not limited to, include various internal components (such as housekeeping loads, etc.), load drawn by external devices (such as lights, small motors, electronic devices, etc.) or power conditioning devices (such as capacitors, reactors, etc.).

The LVDC bus 130 is further coupled to the low voltage side of the DC/DC power converter 110. The LVDC bus 130 may comprise two or more portions, one of which resides within the power system electronics housing 114. Thus, the portion of the LVDC bus 130 in the power system electronics housing 114 can be coupled to another portion of the LVDC bus 130 to facilitate modular construction of the power system electronics housing 114.

Examples of HVDC power sources 128 may include, but are not limited to, fuel cell systems, DC machines (driven, for example, by a combustion engine), capacitors and/or batteries. DC power received from the HVDC power source(s) 128 is transferred to the HVDC bus 112, via connection 132. Similarly, power received from the electric machine 102, transferred via the HVDC bus 112, may be transferred to the HVDC power source(s) 128.

Figure 2:
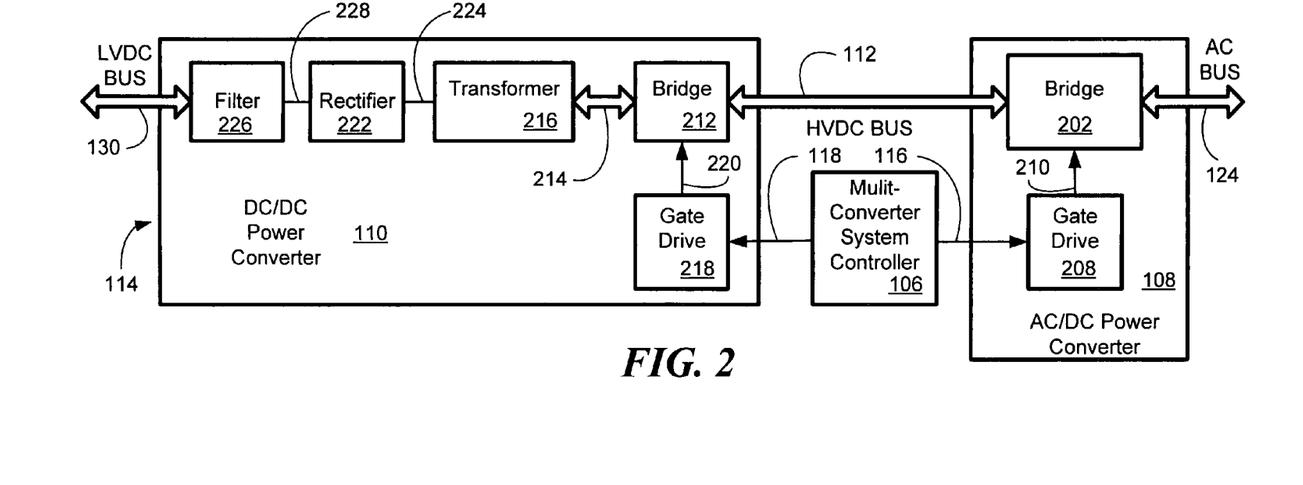
FIG. 2 is a block diagram illustrating in greater detail an AC/DC power converter and a DC/DC power converter controlled by an exemplary embodiment of a multi-converter system controller.

FIG. 2 is a block diagram illustrating in greater detail an AC/DC power converter 108 and a DC/DC power converter 110 controlled by an exemplary embodiment of a multi-converter system controller 106. The AC/DC power converter 108 employs a bridge 202 which inverts DC power into AC power and which rectifies AC power into DC power using a plurality of transistor devices (not shown). Bridge 202 may be comprised of any one of many known types of bi-directional transistor-based converter systems using well-known topologies. Examples of such transistor devices include, but are not limited to, field effect transistors (FETs), metal oxide semiconductor field effect transistors (MOSFETs), or insulated gate bipolar transistors (IGBTs) and associated anti-parallel diodes. Such transistor devices may also be referred to as "power semiconductor devices."

The DC side of bridge 202 is coupled to the HVDC bus 112. The AC side of bridge 202 is coupled to the AC bus 124.

Power flow and/or voltage regulation through the bridge 202 is controlled by gate drive 208. Gate drive 208 provides gating control signals to the transistors forming the bridge 202, via connection 210, in response to control signals from the multi-converter system controller 106.

The DC/DC power converter 110 employs a bridge 212 which converts the relatively higher operating DC voltage of the HVDC bus 112 into the relatively lower operating DC voltage of the LVDC bus 130. Bridge 212 may also be comprised of any one of many known types of bi-directional transistor-based converter systems using well-known topologies. Examples of such transistor devices include, but are not limited to, field effect transistors (FETs), metal oxide semiconductor field effect transistors (MOSFETs), or insulated gate bipolar transistors (IGBTs) and associated anti-parallel diodes.

The high DC voltage side of bridge 212 is coupled to the HVDC bus 112. The low DC voltage side of bridge 212 is coupled, via connection 214, to transformer 216. Transformer 216 is coupled to rectifier 222, via connection 224. Filter 226 is coupled to rectifier 222, via connection 228, and is coupled to the LVDC bus 130.

Power flow and/or voltage regulation through the bridge 212 is controlled by gate drive 218. Gate drive 218 provides gating control signals to the transistor devices residing in the bridge 212, via connection 220, in response to control signs from the multi-converter system controller 106.

The construction, configuration and operation of the various AC/DC power converters 108 and the DC/DC power converters 110, and their internal components, controlled by embodiments of the multi-converter system controller 106, are well known. Accordingly, a detailed discussion of the operation of the components residing in the AC/DC power converter 108 and the DC/DC power converter 110 is not provided herein for brevity, and because such detailed explanation is provided in those references incorporated by reference herein.

Figure 3:
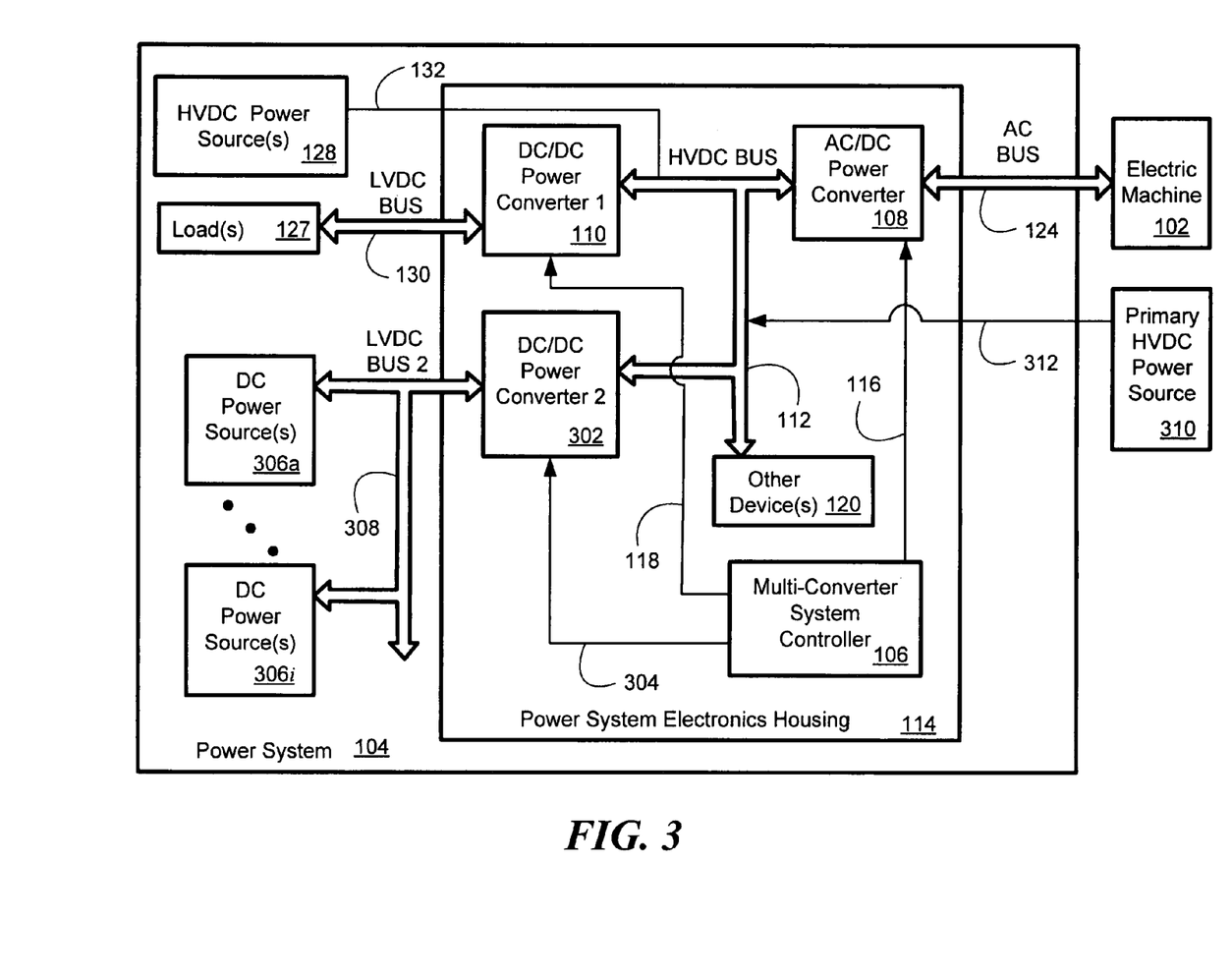
FIG. 3 is a block diagram illustrating an exemplary embodiment of a multi-converter system controller operable to control an AC/DC power converter and a plurality of DC/DC power converters.

If multiple HVDC power sources 128 utilize the same operating voltages, they may share a common LVDC bus 130 and DC/DC power converter 110, assuming that the common LVDC bus 130 and DC/DC power converter 110 have sufficient power capacity ratings to accommodate power transfers by the various HVDC power sources 128. If multiple HVDC power sources 128 utilize different operating voltages, they would utilize different LVDC buses 130 and DC/DC power converter 110. FIG. 3 is a block diagram illustrating an exemplary embodiment of a multi-converter system controller 106 operable to control an AC/DC power converter 108 and a plurality of DC/DC power converters 110, 302.

Like the exemplary embodiment illustrated in FIG. 1, the embodiment of the multi-converter system controller 106 controls the AC/DC power converter 108 and the DC/DC power converter 110. Further, the multi-converter system controller 106 controls the DC/DC power converter 302, via connection 304. The DC/DC power converter 302 provides coupling back to a plurality of DC power sources 306a-i, via the second LVDC bus 308. Such a configuration may be desirable when the operating voltage of the first LVDC bus 130 is different from the operating voltage of the second LVDC bus 306. Alternatively, the capacity of the first DC/DC power converter 110 and/or the capacity of the first LVDC bus 130 may be limited such that the second DC/DC power converter 302 and the LVDC bus 306 are used.

The above-described exemplary embodiment of the multi-converter system controller 106 is only one non-limiting example employed in a power system 104. Many different alternative embodiments are possible.

Also illustrated for convenience in FIG. 3 is a primary HVDC power source 310, coupled to the HVDC bus 112, via connection 312. In some applications, the primary HVDC power source 310 provides relatively high levels of DC power to the electric machine 102. Examples of primary HVDC power source 310 include fuel cells and/or DC machines (driven, for example, by a combustion engine). For instance, the primary HVDC power source 310 may be employed in electric or hybrid motor vehicles.

Figure 4:
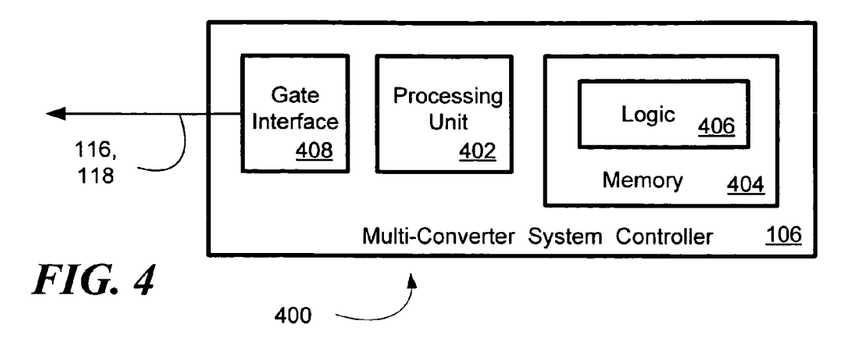
FIG. 4 is a simplified block diagram of a processor based embodiment of multi-converter system controller.

FIG. 4 is a simplified block diagram 400 of a processor-based embodiment of multi-converter system controller 106. This exemplary multi-converter system controller embodiment is implemented in a processor based system 400 having at least a processor 402 and a memory 404 (or other suitable computer-readable or processor-readable medium). Logic 406 for performing the above-described functions of a multi-converter system controller 106 resides in memory 404. Logic 406 may be implemented as a program. Thus, execution of the logic 406 by processor 402 causes the generation of the control signals by the multi-converter system controller 106 which controls the AC/DC power converter 108 and the DC/DC power converter 110 (FIG. 1). An optional gate interface 408 formats the generated control signals into a suitable format for the AC/DC power converter 108 and/or the DC/DC power converter 110.

Figure 5:
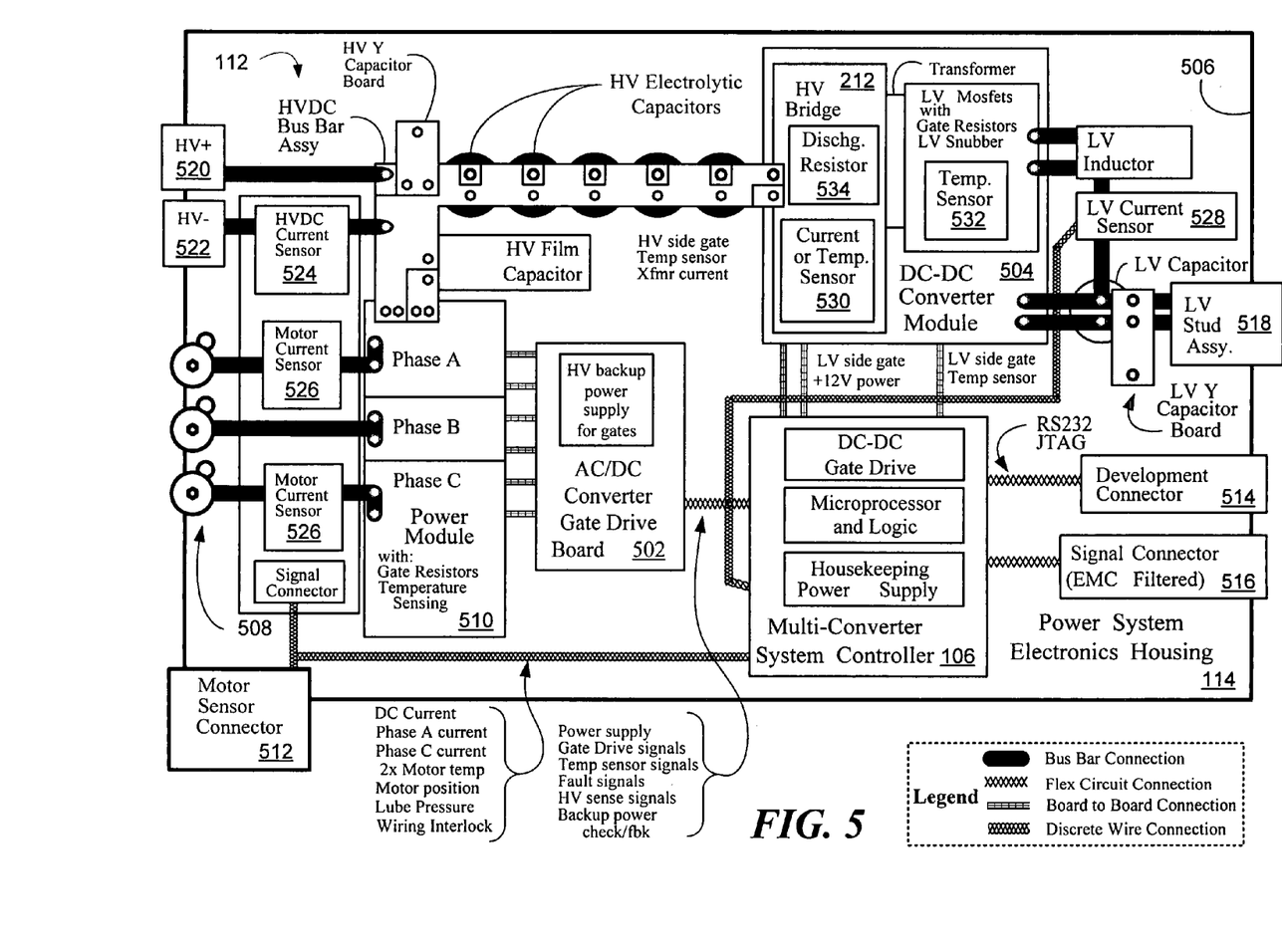
FIG. 5 is a block diagram of an embodiment of the multi-converter system controller controlling an AC/DC converter gate drive and a DC/DC converter module.

FIG. 5 is a block diagram of an embodiment of the multi-converter system controller 106 controlling an AC/DC converter gate drive board 502 (corresponding to the above-described gate drive 218, FIG. 2) and a DC/DC converter module 504 (corresponding to the above-described DC/DC power converter 110, FIGS. 1-3) with a HV bridge 212. The illustrated and labeled components reside within the electronics housing 114, the extent of which is denoted by the electronics housing border 506. Of note, three phase terminals (phase A, B and C) 508 are provided for coupling the Phase A, B and C phase of the power converter module 510 to the AC bus 124 (FIGS. 1-3). A motor sensor connector 512, a development connector 514, a signal connector 516 and an LV stud assembly (Assy.) 518 are provided for coupling to other components (not shown). Also, high voltage (HV+ and HV−) couplings 520 and 522, respectively, are provided to extend the HVDC bus 112 (FIGS. 1-3) beyond the physical limits of the electronics housing border 506. This exemplary embodiment demonstrates the benefits realized by the present invention in that the components residing in the power system electronics housing 114 may be coupled to other elements of the power system 104 (FIG. 1) using a reduced number of couplers and/or connectors.

The exemplary embodiment illustrated in FIG. 5 indicates that there are a variety of sensors residing in the power system electronics housing 114. Sensors illustrated include a HVDC current sensor 524, one or more motor current sensors 526, a low voltage (LV) current sensor 528, a high voltage (HV) bridge current sensor and/or temperature sensor 530 and a LV side gate temperature sensor 532. Other sensors may be included to sense other parameters of interest. Information from these sensors is communicated to the multi-converter system controller 106. Based upon received information from the sensors, control signals communicated to the AC/DC power converter 108 and/or the DC/DC power converter 110 may be adjusted.

Figure 6:
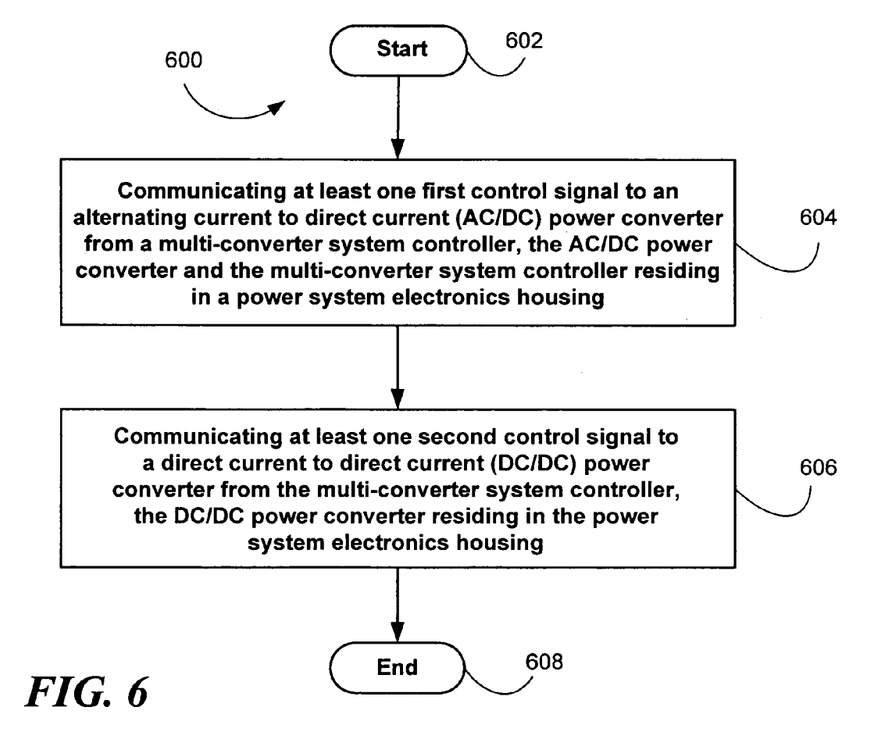
FIG. 6 is a flowchart illustrating an embodiment of a process for controlling at least an AC/DC power converter and a DC/DC power converter with an embodiment of multi-converter system controller.

FIG. 6 is a flowchart 600 illustrating an embodiment of a process for controlling power converters. The flow chart 600 of FIG. 6 shows the architecture, functionality, and operation of an embodiment for implementing the logic 406 (FIG. 4) such that such that the multi-converter system controller 106 (FIGS. 1-5) controls a plurality of power converters. An alternative embodiment implements the logic of flow chart 600 with hardware configured as a state machine. In this regard, each block may represent a module, segment or portion of code, which comprises one or more executable instructions for implementing the specified logical function(s). It should also be noted that in alternative embodiments, the functions noted in the blocks may occur out of the order noted in FIG. 6, or may include additional functions. For example, two blocks shown in succession in FIG. 6 may in fact be substantially executed concurrently, the blocks may sometimes be executed in the reverse order, or some of the blocks may not be executed in all instances, depending upon the functionality involved, as will be further clarified hereinbelow. All such modifications and variations are intended to be included herein within the scope of this disclosure.

The process begins at block 602. At block 604, at least one first control signal is communicated to an AC/DC power converter 108 (FIGS. 1-3) from a multi-converter system controller 106, wherein the AC/DC power converter 108 and the multi-converter system controller 106 reside in a power system electronics housing 114. At block 606, at least one second control signal is communicated to a DC/DC power converter 110 from the multi-converter system controller 106, wherein the DC/DC power converter 110 resides in the power system electronics housing 114. The process ends at block 608.

In the above-described various embodiments, the multi-converter system controller 106 (FIGS. 1-5) may employ a microprocessor, a digital signal processor (DSP), an application specific integrated circuit (ASIC) and/or a drive board or circuitry, along with any associated memory, such as random access memory (RAM), read only memory (ROM), electrically erasable read only memory (EEPROM), or other memory device storing instructions to control operation. The multi-converter system controller 106 may be housed with the other components of the power system 104, may be housed separately therefrom, or may be housed partially therewith.

The above described topology employs patterns, traces or connections and/or vias may eliminate a large number of wire bonds that would otherwise be employed. The reduction in the number of wire bonds required reduces the footprint of the power system electronics housing 114 (FIG. 1), and may reduce cost and/or complexity by reducing the number of discrete elements (wire bonds), and steps associated with attaching those wire bonds. The reduction may also decrease wear and fatigue, for example, that is associated with thermal cycling, thereby increasing reliability and/or lifetime.

As an example of wire bonding benefits provided by the various embodiments, a switchable discharge resistor 534 is illustrated as residing in the HV bridge 212 (FIG. 5). Discharge resistor 534 is controlled by embodiments of the multi-converter system controller 106 which are operable to couple the discharge resistor 534 to the HVDC bus 112. For example, when the system is shut down, it may be desirable to reduce voltage across the HVDC bus 112 to zero volts or to another nominal value. The multi-converter system controller 106 is responsive to such situations in that a signal may be communicated to a switch device 700 (FIGS. 7A and 7B) so that the discharge resistor 534 becomes coupled to the HVDC bus 112.

Discharge resistor 534 discharges voltage across the HVDC bus 112 within a suitable time period. Because of the large capacitance of the HVDC bus 112 needed for operation of some types of DC/DC and/or AC/DC power converters, the discharge resistor 534 may need to be capable of discharging up to hundreds of watts of power.

Discharge time, in one embodiment, is approximately one minute, which corresponds to the time that a technician hypothetically requires to open the power system electronics housing 114. The value of the discharge resistor 534 is dependent upon the desired time for the HVDC bus 112 to discharge (corresponding to some time of interest, such as the above described time to open the power system electronics housing 114) and the capacitance associated with the HVDC bus 112.

Using additional and/or heavier wire bonds to connect the discharge resistor 534 to the HVDC bus 112 improves reliability of the discharge resistor. Heavier bonds decrease the likelihood of bonding failure and/or connection failure, and additional wire bonds provide redundancy in the event of a wire bond failure and/or connection failure.

Figure 7A:
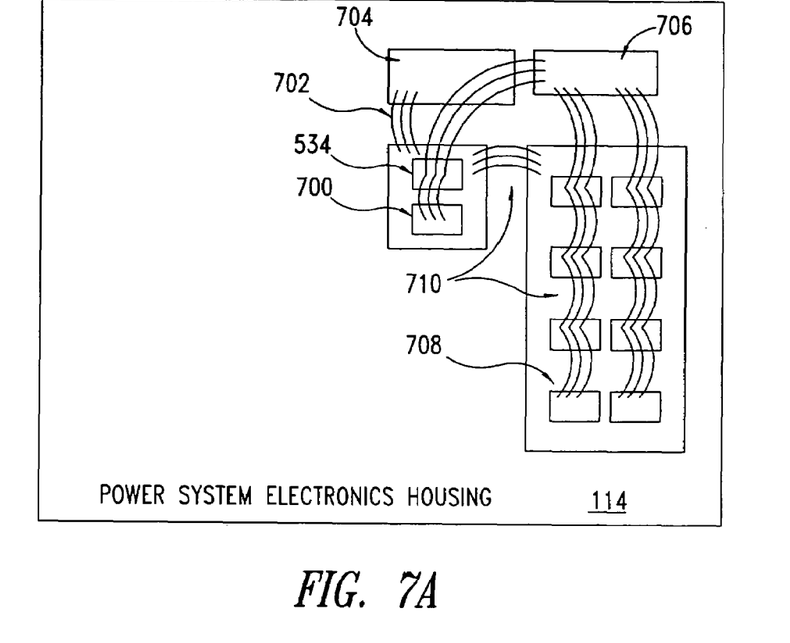
FIGS. 7A-B are block diagrams illustrating various wire bond connection embodiments.
Figure 7B:
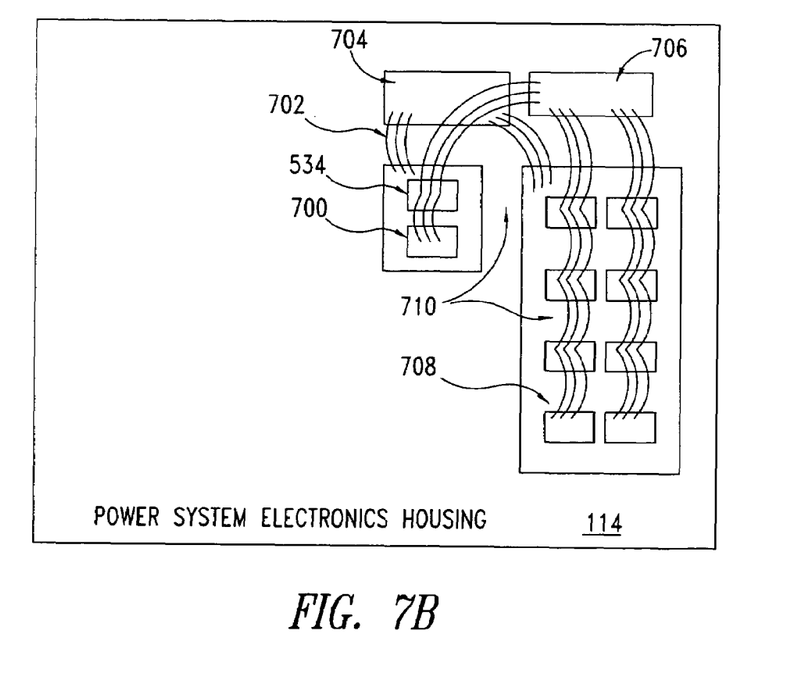

FIGS. 7A and 7B illustrate embodiments employing at least one discharge resistor 534, and its associated switch device 700, using relatively heavy wirebonds 702 for bonding to the +HVDC bus 704 and to the −HVDC bus 706 (corresponding to the HVDC bus 112 of FIGS. 1-3 and 5). In FIG. 7A, the discharge resistor 534 is wired in series with a plurality of various active power devices 708. In FIG. 7B, the discharge resistor 534 is wired in parallel with the plurality of various active power devices 708. The plurality of active power devices 708 are bonded with relatively smaller wire bonds 710. The discharge resistor 534 and other active devices 708 may be included together in a single power system electronics housing 114 since the various embodiments of the multi-converter system controller 106 are operably coupled to the plurality of active devices 708 which reside together in the power system electronics housing 114. In other embodiments, a plurality of switchable discharge resistors 534, and the associated switch devices 700, may be used. Switch device 700 may be implemented with any type of electronic, solid state or firmware type switching device or means commonly employed in the art. Such controllable switch devices 700 may be implemented by a combination of software and firmware using components and methods commonly employed in the art of switching electrical devices. It is intended that all such implementations of switch devices 700, and their associated control means operable by embodiments of the multi-converter system controller 106, be included herein within the scope of this disclosure.

The above description of illustrated embodiments, including what is described in the Abstract, is not intended to be exhaustive or to limit the invention to the precise forms disclosed. Although specific embodiments of and examples are described herein for illustrative purposes, various equivalent modifications can be made without departing from the spirit and scope of the invention, as will be recognized by those skilled in the relevant art. The teachings provided herein can be applied to other power conversion systems, not necessarily the exemplary AC/DC and DC/DC power converter embodiments generally described above. For example, the power conversion system may comprise additional AC/DC power converters or DC/DC power converters with different topologies, as may be suited to the particular application. Additionally or alternatively, while the illustrated embodiments generally show three-phase AC/DC power converter topologies for the primary AC/DC power converters, some embodiments can include a less or a greater number of phase legs. Additionally, or alternatively, the power conversion system 104 may omit the AC/DC power converter 108, or may employ a different topology for the AC/DC converter 108 than that illustrated in the Figures.

As used herein and in the claims, transistor devices (which may also be referred to as "power semiconductor devices") includes suitable semiconductor devices designed to handle relatively large currents, large voltages and/or large amounts of power with respect to standard semiconductor devices, including power semiconductor switch devices, power semiconductor diodes and other such devices used in power distribution, for example, grid or transportation related applications. As discussed above, some of the transistor devices may, for example, take the form of MOSFETs, while others of the transistor may take the form of IGBTs. Use of MOSFETS permits the primary DC/DC power converters 110 (FIG. 1) and/or 302 (FIG. 3), to operate at higher switching frequencies than would otherwise be possible with IGBTs. However, in some embodiments the transistor devices of the DC/DC power converters 110 and/or 302 may take the form IGBTs or other suitably rated switching devices, particularly where the desired operating frequency of the DC/DC power converters 110 and/or 302 is sufficiently low. Further, in some embodiments the transistor devices of the AC/DC power converter 108 may take the form of MOSFETS, particularly where cost factors permit such.

The foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure. In at least one embodiment, the multi-converter system controller 106 maintains a commanded output voltage on the capacitors by varying the duty cycles of the transistor devices of the DC/DC power converters 110 and/or 302. In some embodiments, control may be coordinated among the multi-converter system controller 106, a fuel cell system controller (not shown), and/or an integrated power train controller (not shown).

In addition, those skilled in the art will appreciate that the control mechanisms taught herein are capable of being distributed as a program product in a variety of forms, and that an illustrative embodiment applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment of the present systems and methods. Thus, the appearances of the phrases "in one embodiment" or "in an embodiment" in various places throughout this specification are not necessarily all referring to the same embodiment. Further more, the particular features, structures, or characteristics may be combined in any suitable manner in one or more embodiments.

The various embodiments described above can be combined to provide further embodiments. All of the above U.S. patents, patent applications and publications referred to in this specification, including but not limited to: provisional utility application entitled, "POWER SYSTEM METHOD AND APPARATUS," having Ser. No. 60/621,012, filed Oct. 20, 2004; provisional utility application entitled, "PRESS (NON-SOLDERED) CONTACTS FOR HIGH CURRENT ELECTRICAL CONNECTIONS IN POWER MODULES," having Ser. No. 60/233,992, filed Sep. 20, 2000; provisional utility application entitled, "LEADFRAME-BASED MODULE DC BUS DESIGN TO REDUCE MODULE INDUCTANCE," having Ser. No. 60/233,993, filed Sep. 20, 2000; provisional utility application entitled, "EMI REDUCTION IN POWER MODULES THROUGH THE USE OF INTEGRATED CAPACITORS ON THE SUBSTRATE LEVEL," having Ser. No. 60/233,994, filed Sep. 20, 2000; provisional utility application entitled, "PRESS (NON-SOLDERED) CONTACTS FOR HIGH CURRENT ELECTRICAL CONNECTIONS IN POWER MODULES," having Ser. No. 60/233,995, filed Sep. 20, 2000; provisional utility application entitled, "SUBSTRATE-LEVEL DC BUS DESIGN TO REDUCE MODULE INDUCTANCE," having Ser. No. 60/233,996, filed Sep. 20, 2000; U.S. patent entitled, "POWER CONVERTER SYSTEM," having U.S. Pat. No. 6,603,672, issued Aug. 5, 2003; non-provisional application entitled, "LEADFRAME-BASED MODULE DC BUS DESIGN TO REDUCE MODULE INDUCTANCE," having Ser. No. 09/882,708, filed Jun. 15, 2003; U.S. patent entitled, "PRESS (NON-SOLDERED) CONTACTS FOR HIGH CURRENT ELECTRICAL CONNECTIONS IN POWER MODULES," having U.S. Pat. No. 6,793,502, issued Sep. 21, 2004; U.S. patent entitled, "SUBSTRATE-LEVEL DC BUS DESIGN TO REDUCE MODULE INDUCTANCE," having U.S. Pat. No. 6,845,017, issued Jan. 18, 2005; U.S. patent entitled, "EMI REDUCTION IN POWER MODULES THROUGH THE USE OF INTEGRATED CAPACITORS ON THE SUBSTRATE LEVEL," having U.S. Pat. No. 6,636,429, issued Oct. 21, 2003; non-provisional application entitled, "LEADFRAME-BASED MODULE DC BUS DESIGN TO REDUCE MODULE INDUCTANCE," having Ser. No. 10/109,555, filed Mar. 27, 2002; non-provisional application entitled, "DUAL POWER MODULE POWER SYSTEM," having Ser. No. 10/642,424, filed Aug. 14, 2003; non-provisional application entitled, "INTEGRATION OF PLANAR TRANSFORMER AND/OR PLANAR INDUCTOR WITH POWER SWITCHES IN POWER CON- VERTER," having Ser. No. 10/964,000, filed Oct. 12, 2004; non-provisional application entitled, "INTERLEAVED POWER CONVERTER," having Ser. No. 10/861,319, filed Jun. 4, 2004; provisional application entitled, "POWER MODULE ARCHITECTURE," having Ser. No. 60/471,387, filed May 16, 2003; non-provisional application entitled, "LEADFRAME-BASED MODULE DC BUS DESIGN TO REDUCE MODULE INDUCTANCE," having Ser. No. 11/245,723, filed Oct. 6, 2005; non-provisional application entitled, "POWER SYSTEM METHOD AND APPARATUS," having Ser. No. 11/255,162, filed Oct. 20, 2005; non-provisional application entitled, "POWER CONVERTER ARCHITECTURE EMPLOYING AT LEAST ONE CAPACITOR ACROSS A DC BUS," having Ser. No. 10/664,808, filed Sep. 17, 2003; U.S. patent entitled, "POWER MODULE WITH VOLTAGE OVERSHOOT LIMITING," having U.S. Pat. No. 6,906,404, issued Jun. 14, 2005; non-provisional application entitled, "TRI-LEVEL INVERTER," having Ser. No. 10/658,804, filed Sep. 9, 2003; and U.S. patent entitled, "POWER CONVERTER SYSTEM," having U.S. Pat. No. 6,845,020, issued Jan. 18, 2005, are incorporated herein by reference, in their entirety, as are the sections in this specification. Aspects of the invention can be modified, if necessary, to employ systems, circuits and concepts of the various patents, applications and publications to provide yet further embodiments of the invention.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A power system for controlling power transfers to an electric machine, comprising:
   a power system electronic housing including three phase terminals for coupling to the electric machine;
   an alternating current/direct current (AC/DC) power converter disposed within the power system electronic housing and operable to convert alternating current (AC) power received from the electric machine into direct current (DC) power when the electric machine is operating as a generator, and operable to convert received DC power from at least one DC power source into AC power when the electric machine is operating as a motor;
   at least one direct current/direct current (DC/DC) power converter disposed within the power system electronic housing and operable to convert a low DC voltage to a high DC voltage;
   a multi-converter system controller disposed within the power system electronic housing and operable to control the AC/DC power converter and the DC/DC power converter.

2. The power system of claim 1 wherein the DC/DC power converter comprises:
   a bridge of transistor devices operable to convert the low DC voltage to the high DC voltage; and
   a gate drive coupled to the bridge of transistor devices and the multi-converter system controller, and operable to provide a plurality of gate signals to the gate drive in accordance with at least one control signal received from the multi-converter system controller.

3. The power system of claim 1 wherein the AC/DC power converter comprises:
   a bridge of transistor devices operable to convert the AC power into the DC power when the electric machine is operating in the generation mode, and operable to convert the DC power into the AC power when the electric machine is operating in the motor mode; and
   a gate drive coupled to the bridge and the multi-converter system controller, and operable to provide a plurality of gate signals to the bridge of transistor devices in accordance with at least one control signal received from the multi-converter system controller.

4. The power system of claim 1, further comprising:
   a second DC/DC power converter that is controlled by the multi-converter system controller.

5. The power system of claim 1, further comprising:
   a high voltage (HV) DC bus coupling the AC/DC power converter and the DC/DC power converter; and
   a low voltage (LV) DC bus coupling the DC power source and the DC/DC power converter,
   wherein the AC power received from the electric machine is transferred over the AC/DC power converter, the HVDC bus, the AC/DC power converter and the LVDC bus, and is stored in the DC power source; and wherein DC power received from the DC power source is transferred over the LVDC bus, the DC/DC power converter, the HVDC bus and the AC/DC power converter, and is provided to the electric machine.

6. The power system of claim 1, further comprising:
   a high voltage (HV) DC bus coupling the AC/DC power converter and the DC/DC power converter; and
   a switchable discharge resistor coupled to the HVDC bus and operable to discharge the HVDC bus when actuated by the multi-converter system controller.

7. A method for controlling power converters, the method comprising:
   coupling an electric machine to three phrase terminals supported within a power system electronics housing;
   communicating at least one first control signal to an alternating current/direct current (AC/DC) power converter from a multi-converter system controller, the AC/DC power converter and the multi-converter system controller residing in the power system electronics housing;
   communicating at least one second control signal to a direct current/direct current (DC/DC) power converter from the multi-converter system controller, the DC/DC power converter residing in the power system electronics housing;
   converting alternating current (AC) power generated by the electric motorinto direct current (DC) power by the AC/DC power converter in accordance with the received first control signal;
   transferring the DC power from the AC/DC power converter to the DC/DC power converter over a high voltage DC bus, where the high voltage DC bus is disposed within the power system electronics housing; and
   converting received DC power from a high DC voltage to a low DC voltage in accordance with the received second control signal.

8. The method of claim 7, wherein converting the AC power into DC power further comprises receiving the AC power from the electric machine when the electric machine is operating as a generator.

9. The method of claim 8, further comprising:
   transferring the DC power converted to the low DC voltage to a DC power source; and
   storing the received DC power in the DC power source.

10. The method of claim 7 wherein in response to communicating the first and second control signals, the method further comprising:

converting received DC power from a low DC voltage to a high DC voltage in accordance with the received second control signal;

transferring the DC power at the high DC voltage from the DC/DC power converter to the AC/DC power converter over a high voltage DC bus; and converting alternating current (AC) power into DC power by the AC/DC power converter in accordance with the received first control signal.

11. The method of claim 10 wherein converting the DC power from the low DC voltage to the high DC voltage further comprises receiving the DC power at the low DC voltage from a DC power source.

12. The method of claim 11, further comprising transferring the AC power to the electric machine when the electric machine is operating as a motor.

13. The method of claim 7 wherein communicating the second control signal further comprises communicating from the multi-converter system controller a plurality of gating signals to a gate drive residing in the DC/DC power converter to cause a bridge of transistor devices to convert a low DC voltage to a high DC voltage.

14. The method of claim 7 wherein communicating the first control signal further comprises communicating from the multi-converter system controller a plurality of gating signals to a gate drive residing in the AC/DC power converter to cause a bridge of transistor devices to convert the AC power into the DC power when the electric machine is operating in a generation mode, and to convert the DC power into the AC power when the electric machine is operating in a motor mode.

15. The method of claim 7, further comprising:
installing the multi-converter system controller, the AC/DC power converter and the DC/DC power converter in the power system electronics housing.

16. The method of claim 7, further comprising:
receiving information from at least one sensor; and
adjusting at least one of the first control signal and the second control signal based upon the information received from the sensor.

17. A processor-readable medium storing instructions for causing a processor to control power transfers by:
determining at least one first control signal that is communicated to an alternating current/direct current (AC/DC) power converter from a multi-converter system controller, the AC/DC power converter and the multi-converter system controller residing in a power system electronics housing;
determining at least one second control signal that is communicated to a direct current/direct current (DC/DC) power converter from the multi-converter system controller, the DC/DC power converter residing in the power system electronics housing; and
determining at least one third control signal that is communicated to a discharge resistor to control voltage across a high voltage DC bus within the power system electronics housing and coupled between the AC/DC power converter an the DC/DC power converter.

18. The processor-readable medium of claim 17, further storing instructions for causing the processor to control power transfers by:
receiving information from at least one sensor; and
adjusting at least one of the first control signal and the second control signal based upon the received information from the sensor.

19. A modular power system that controls power transfers between an electric machine and at least one direct current (DC) power source, comprising:

a power system electronics housing;
an alternating current/direct current (AC/DC) power converter residing in the power system electronics housing, operable to convert alternating current (AC) power received from the electric machine into DC power when the electric machine is operating as a generator, and operable to convert received DC power from the DC power source into AC power when the electric machine is operating as a motor;
at least one direct current/direct current (DC/DC) power converter residing in the power system electronics housing, and operable to convert a low DC voltage to a high DC voltage;
a multi-converter system controller residing in the power system electronics housing, operable to control the AC/DC power converter by communicating at least one first control signal to the AC/DC power converter, and operable to control the DC/DC power converter by communicating at least one second control signal to the AC/DC power converter
a high voltage (HV) DC bus residing in the power system electronics housing, the HVDC bus coupling the AC/DC power converter and the DC/DC power converter; and
a switchable discharge resistor coupled to the HVDC bus and operable to discharge the HVDC bus when actuated by the multi-converter system controller.

20. The modular power system of claim 19, further comprising:
a low voltage (LV) DC bus portion residing in the power system electronics housing, the LVDC bus coupling the DC power source and the DC/DC power converter,
wherein the AC power received from the electric machine is transferred over the AC/DC power converter, the HVDC bus, the DC/DC power converter and the LVDC bus portion, and is stored in the DC power source; and
wherein DC power received from the DC power source is transferred over the LVDC bus portion, the DC/DC power converter, the HVDC bus and the AC/DC power converter, and is provided to the electric machine.

21. The modular power system of claim 19 wherein the DC/DC power converter comprises:
a bridge of transistor devices operable to convert the low DC voltage to the high DC voltage; and
a gate drive coupled to the bridge and the multi-converter system controller, and operable to provide a plurality of gate signals to the gate drive in accordance with the second control signal received from the multi-converter system controller.

22. The modular power system of claim 19 wherein the AC/DC power converter comprises:
a bridge of transistor devices operable to convert the AC power into the DC power when the electric machine is operating in the generation mode, and operable to convert the DC power into the AC power when the electric machine is operating in the motor mode; and
a gate drive coupled to the bridge of transistor devices and the multi-converter system controller, and operable to provide a plurality of gate signals to the bridge of transistor devices in accordance with the first control signal received from the multi-converter system controller.

23. The modular power system of claim 19, further comprising a second DC/DC power converter residing in the power system electronics housing, and operable to convert a second low DC voltage to the high DC voltage.

24. The modular power system of claim 19 wherein the power system electronics housing is coupled to the electric machine.

* * * * *